Nov. 2, 1971   J. F. LASH   3,616,686
ENGINE STOPPING CONTROL FOR AN AIR MOTORED
ENGINE BALANCING SYSTEM
Filed Aug. 14, 1970

INVENTOR.
Joseph F. Lash
BY
Warren D. Hill
ATTORNEY

United States Patent Office 3,616,686
Patented Nov. 2, 1971

3,616,686
ENGINE STOPPING CONTROL FOR AN AIR-MOTORED ENGINE BALANCING SYSTEM
Joseph F. Lash, Ferndale, Mich., assignor to General Motors Corporation, Detroit, Mich.
Filed Aug. 14, 1970, Ser. No. 63,841
Int. Cl. G01n 15/00
U.S. Cl. 73—116
4 Claims

ABSTRACT OF THE DISCLOSURE

A circuit is provided in conjunction with an engine balancing system for stopping an engine driven by air pressure with the position of engine unbalance at a predetermined location. A phase-adjusting device in the circuit takes into account the angular position of engine unbalance as well as the amount of engine coasting occurring after a stop signal is issued.

---

Figure 1:
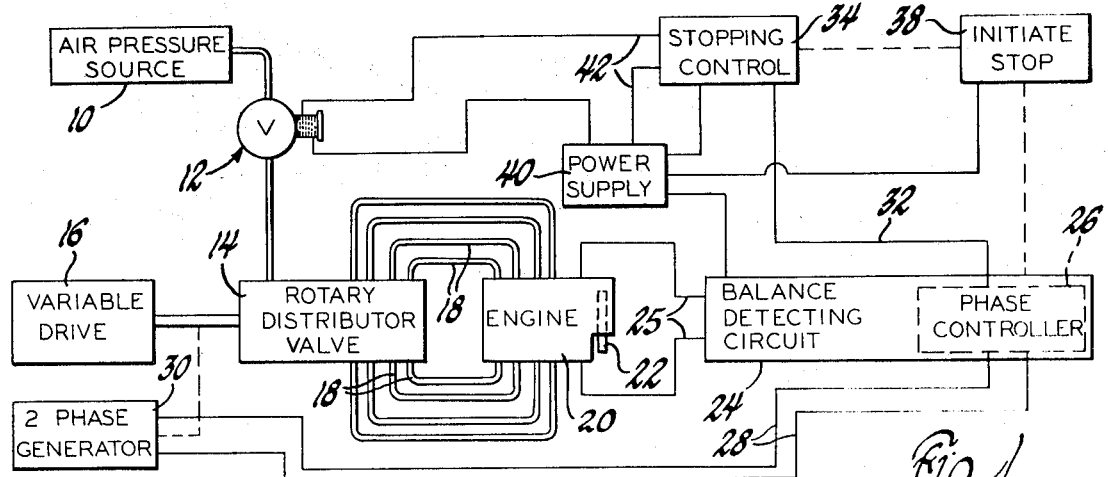

This invention relates to a control circuit for stopping an air-motored engine in a desired angular position dependent upon the location of engine unbalance.

In engine balancing systems, it is desirable after detecting the angular location of unbalance and the amount of unbalance to position the flywheel or other element of the engine so that the position at which weight must be added or removed is coincident with the location of an available balance correcting device or at least is accessible to such a device so that the appropriate correction may be made at the proper location.

In the production of automobile engines the practice has been adopted to operate the engine for balancing purposes by air motoring. That is, pulses of compressed air are distributed by a valve arrangement to the various cylinders of an engine in proper sequence so that the engine is caused to rotate without supplying fuel to the engine. It is therefore desirable after the unbalance location has been determined to stop the engine at such a location so that balance detection can be accomplished in a minimum time and without the inconvenience of indexing the engine flywheel to the desired position.

It is therefore a general object of this invention to provide a circuit responsive to the measured unbalance angle of the engine for timing the shut-off point of the air-motoring system so that the engine comes to rest in the desired angular position.

It is another object of the invention to provide a circuit to angularly position an engine according to its angle of unbalance in a minimum time.

It is a further object of the invention to provide a method of sensing the unbalance position of an air-motored engine and timing the termination of air-motoring so that the engine comes to rest at a desired position for balance correction.

The invention is carried out by producing a signal synchronous with engine rotation and phase-adjusting the signal to compensate for the unbalance location and the amount of engine coasting which is expected to occur after termination of air-motoring, and issuing a termination signal so that the engine will come to rest at a desired location.

The invention is further carried out by providing a reference signal synchronous with engine rotation, a phase controller set at the angle of engine unbalance to provide an output signal having a phase according to the unbalance angle, a phase-shifting circuit for further adjusting the phase of the signal by an amount required for the engine to stop after termination of air-motoring, a wave-shaping circuit to provide a termination pulse in phase with the phase-adjusted signal and a relay circuit actuated by the pulse for issuing an air-motoring termination signal.

Figure 2:
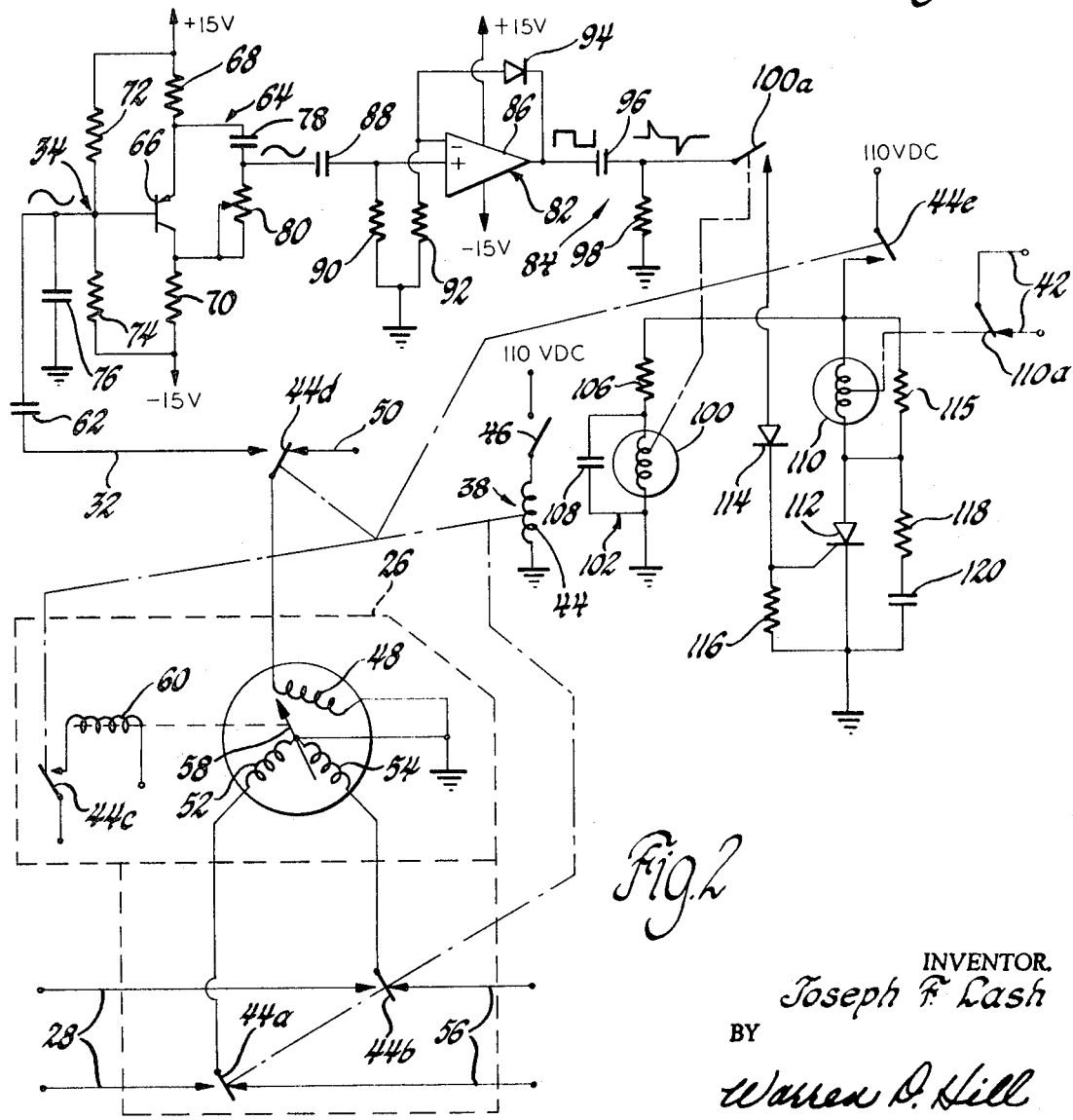

The above and other advantages will be made more apparent from the following specification taken in conjunction with the accompanying drawings wherein like reference numerals refer to like parts and wherein:

FIG. 1 is a block diagram of an air-motoring system combined with balance detecting circuitry and stopping circuitry according to the invention; and, FIG. 2 is a schematic diagram of the stopping circuitry according to the invention.

As shown in FIG. 1, an air pressure source 10 is connected through a solenoid operated valve 12 to a rotary distributor valve 14 which is rotated by a variable speed drive 16 such as an electric motor. The rotary distributor valve is connected by eight air lines 18 to an eight-cylinder engine 20, the lines being connected to the engine at the spark plug holes. The rotary distributor valve 14 during rotation sequentially applies pulses of compressed air to the engine cylinders to cause engine rotation at the same speed as the distributor valve 14, thereby producing air-motoring of the engine. The distributor valve has a fixed angular correspondence to the engine flywheel position. The air-motoring device per se is not the subject of the present invention and will not be described further herein. However, further details of the system may be found in the May 1969 issue of Auto Products, page 29. A typical rotary distributor valve is further described in the United States patent to Winton 1,762,206. The engine contains a flywheel 22 which is partly enclosed within the engine housing but has a lower exposed portion accessible for balance correction operations.

A balance detecting circuit 24 of conventional structure is connected by lines 25 to well-known vibration pick-up devices, not shown, mounted on the engine 20. The balance detecting circuit 24 includes a phase controller 26. The phase controller 26 is connected by lines 28 to a two-phase generator 30 which is synchronously driven by the variable drive 16 so that the output of the generator 30 will be in a predetermined phase relationship with the rotation of the engine 20. The phase controller is connected by line 32 to a stopping control circuit 34 which controls the solenoid valve 12. An initiate stop circuit 38 is connected to both the balance detecting circuit 24 and the stopping control circuit 34. The power supply 40 provides electrical power to the circuits 26, 34 and 38 and the solenoid valve 12.

The general operation of the system is that the solenoid valve 12 is normally energized to supply air pressure to the rotary distributor valve 14 and the variable drive rotates the distributor valve which causes the engine to rotate at, say, 800 r.p.m. During engine rotation, the balance detecting circuit 24 determines the amount and the angle of engine unbalance and stores the unbalance angle information in the phase controller 26. The initiate stop circuit 38 is a manually controlled switching device which is operated after the balance detection has been completed to signal that the engine rotation should be stopped. Alternatively, the initiate stop circuit 38 is a timer set for, say, 8 seconds, which is triggered at the beginning of the balance cycle and then at the lapsed time, automatically signals engine stopping. The time stopping control 34 in conjunction with the phase controller 26 and the two-phase generator 30 times the issuance of a termination signal to the solenoid valve 12 so that the engine will stop at such an angular position that the portion of the flywheel 22 requiring a balance correction will be arrested at its lower exposed position. When the stopping control 34 deenergizes the solenoid valve 12, air pressure is immediately cut off from the rotary distributor valve 14 and the engine stops very soon after the termination signal is given. Rapid engine deceleration is accomplished by the frictional characteristics of the engine as well as the compressive action of the engine pistons on the air trapped within the cylinders. The coasting angle of the engine, that is, the amount of engine revolution occurring after the termination signal, typically is about one-half or three-fourths of an engine revolution. It has been discovered that for a given type of engine operating at a given speed, the coasting angle is nearly constant. Therefore, when the coasting angle for one representative engine has been measured, then the coasting angle of all similar engines from the same production line can be predicted. This important fact makes possible the design of the stopping circuit 34 to be described.

FIG. 2 illustrates the initiate stop circuit 38 as comprising a relay coil 44 connected through a manually operable switch 46 to a voltage source. Several relay contacts 44a, 44b, 44c, 44d and 44e are shown in their normal positions during operation of the balance detection circuit. At the completion of balance detection, the initiate stop circuit is operated by closing the switch 46 which energizes the relay coil 44 thereby moving the relay contacts 44a–44e to their opposite positions.

The phase controller 26 during the balance detecting cycle serves as a phase comparator or a sensor developing phase comparison information which is stored or preserved so that the phase controller 26 can be said to have a memory function. The phase controller 26 is of known construction and is commercially available. A General Electric polarized vane power factor meter, Type AB–18, is one of such commercially available instruments and will indicate phase angle. The controller 26 includes a single winding 48 which is energized by an unbalance signal developed on line 50 by the balance detection circuit 24 through a switch 44d. The controller 26 further includes two quadrature related windings 52 and 54 which are connected by relay contacts 44a and 44b to line 56 carrying a two-phase reference signal from the balance detecting circuit 24. The phase controller 26 also includes a movable vane 58 depicted as an arrow in the drawings positioned within the magnetic fields of the windings 48, 52 and 54. The unbalance signal on the winding 48 produces a synchronously reversing magnetic field that interacts with the rotating magnetic field of the windings 52 and 54 and causes the movable vane 58 to be deflected an amount corresponding to the difference between the phases of the unbalance and reference signals. At the end of the balance detecting cycle, when the relay 44 is energized, the vane 58 is magnetically clamped to retain its angular position by a coil 60 which is energized by the closure of relay contacts 44c. Hence the memory function results with the unbalance angle information being retained for use during the stopping cycle. Reference may be had to United States patent to Lash 3,319,470 for further information on the use of the phase controller and its interconnection in a typical balancing system.

When the initiate stop circuit 38 is actuated and the relay coil 44 is energized, relay contacts 44a and 44b are switched to contact the phase controller windings 52 and 54 to lines 28 so that the coils are energized by the two-phase signal from generator 30 which is synchronous with engine rotation. The phase controller 26 then induces in coil 48 and on line 32 a sinusoidal signal having a phase dependent upon the position of the vane 58 and therefore dependent on the angle of engine unbalance. That signal is then passed by line 32 through a condensor 62 for blocking DC signals to a phase-shifting amplifier 64. The phase-shifting amplifier comprises a split load inverting circuit including a transistor 66 having its emitter connected through a load resistor 68 to a +15 v. power source and its collector is connected through another resistor 70 to a −15 v. power source. Voltage dividing resistors 72 and 74 are serially connected between the +15 v. and −15 v. power sources and have their midpoint connected at the base of the transistor 66 for transistor biasing. The base is also connected through a capacitor 76 to ground for filtering harmonic frequencies. A phase-shifting network comprises a capacitor 78 and a variable resistance 80 across the emitter and collector of the transistor 66 and the junction point thereof serves as the output. The phase-shifting network provides a phase adjustment according to the value of the resistance 80 of from 0° to almost 180°. Where a greater range of phase adjustment is desired, a reversing switch may be added to reverse the relative positions of the capacitor 78 and the resistor 80. When reversed the phase adjustment from 180° to nearly 360° may be accomplished by varying the value of the resistor 80. The resistance 80 is adjusted so that the phase shift will be equal to the coasting angle of the type of engine being balanced.

A wave-shaping circuit includes a squaring amplifier 82 and a differentiator 84. The squaring amplifier 82 comprises an operational amplifier 86 having its positive input connected to the output of the phase-shifting amplifier 64 through a DC blocking capacitor 88. Biasing for the amplifier 86 is provided by resistors 90 and 92 connected between the amplifier inputs and ground. Amplifier feedback is provided by a diode 94 connected between the negative amplifier input and its output. The resulting square wave output is in phase with the sine wave from the output of the phase-adjusting amplifier 64 and is supplied to the differentiator circuit 84 which comprises a capacitor 96 in series with the signal and a resistor 98 to ground. The differentiator output then is a train of positive and negative pulses coincident with the rising and falling edges of the squaring waves and these pulses are fed to normally open relay contacts 100a.

A time delay relay circuit 102 is connected to a DC voltage source through relay contacts 44e which are closed when the relay coil 44 is energized. Since the other contacts of relay 44 may cause electrical noise upon switching, which would have adverse effects on the output of the stopping circuit, the time delay circuit 102 holds the contacts 100a open for a fraction of a second after the energization of the relay coil 44. The circuit 102 comprises a relay coil 100 in series with a resistor 106 and the contacts 44e. A capacitor 108 is connected across the relay coil 100. Thus, due to the RC time constant of resistor 106 and capacitor 108, the relay coil 100 cannot become fully energized until a short time after the contacts 44e have been closed. When the coil is energized, then its contacts 100a will become closed to supply the differentiated pulses to an output circuit.

The output circuit comprises a relay coil 110 connected to a DC source through relay contacts 44e and is in series with the anode of a silicon controlled rectifier 112, the cathode of which is connected to ground. The contacts 100a are connected through a diode 114 to the gate of the SCR and a resistor 116 is connected from the gate to ground. A large resistor 115 is connected across the relay coil 110 for damping the discharge current of that coil when its circuit is interrupted. A resistor 118 and capacitor 120 are serially connected across the SCR to suppress anode triggering which might otherwise occur due to noise in the circuit such as that caused by the closing of the contacts 44e. The relay coil 110 when energized opens relay contacts 110a to open the line 42 and deenergize the solenoid valve 12. With this arrangement of the output circuit, then, the first positive pulse from the differentiator 84 which occurs after the closing of the contacts 100a is passed by the diode 114 to trigger the SCR into conduction and to thereby energize the coil 110 which issues an air-motoring termination signal by opening the contacts 110a.

In summary, the operation of the stopping circuit comprises utilizing a conventional engine balancing circuit to position the vane 58 of the phase controller 26 according to the angle of engine unbalance. After the initiate stop circuit 38 is actuated, a two-phase reference signal on line 28 synchronous with engine rotation, is supplied to the phase controller 26 which in turn produces on line 32 a signal whose phase is shifted according to the position of the vane 58 and hence according to the position of unbalance of the engine. The phase-adjusting amplifier 64 has been preset according to the coasting angle of the engine type being processed. The phase-adjusting amplifier 64 then produces a signal out-of-phase with its input in an amount equal to the coasting angle. This signal is then squared and differentiated to provide in time with the phase-adjusted signal a positive triggering pulse which triggers the SCR and energizes the relay 110 to a signal for termination of air motoring. After this point, the engine will, ideally, coast through the predetermined coasting angle so that the flywheel of the engine will come to rest with the unbalanced location at bottom dead center of the engine. Under practical operating conditions, it is not likely that all the engines will have exactly the same coasting angle but they are close enough so that the unbalanced portion of the flywheel is near bottom dead center so as to be exposed and accessible for the addition or removal of weight.

The embodiment of the invention described herein is for purposes of illustration and the scope of the invention is intended to be limited only by the following claims.

It is claimed:

1. Apparatus for stopping an air driven engine at an angle determinable by the position of engine unbalance comprising:
   air pressure means connected to cylinders of the engine for driving the engine, and means for disconnecting the air pressure means whereupon the engine will coast through a predetermined angle of rotation to a stop,
   balancing means for detecting the angular position of engine unbalance,
   means including the balancing means for producing a signal in synchronism with engine rotation and in a known phase relation with the angular position of engine unbalance,
   means for adjusting the phase of the signal an amount corresponding to the predetermined angle of coasting,
   and means responsive to the phase adjusted signal for operating the air pressure disconnecting means,
   whereby the engine comes to a stop with its position of unbalance at a preset location after coasting through an angle consistent with the amount of signal phase adjustment, 2. Apparatus for stopping an air driven engine at an angle determinable by the position of engine unbalance comprising:
   air pressure means connected to the cylinders of the engine for driving the engine, and means for disconnecting the air pressure means whereupon the engine will coast through a predetermined angle of rotation to a stop,
   balancing means for detecting the angular position of engine unbalance including a phase controller for storing unbalance position information,
   means for producing a first signal in synchronism with engine rotation,
   means responsive to the first signal including the phase controller for producing a second signal phase displaced from the first signal by an amount dependent on the angular position of unbalance,
   means for adjusting the phase of the second signal by an amount corresponding to the predetermined angle of coasting,
   and means responsive to the phase adjusted second signal for operating the means for disconnecting the air pressure means,
   whereby the engine comes to a stop with its position of unbalance at a preset location.

3. Apparatus for stopping an air driven engine at an angle determinable by the position of engine unbalance comprising:
   air pressure means connected to the cylinders of the engine for driving the engine, and means for disconnecting the air pressure means whereupon the engine will coast through a predetermined angle of rotation to a stop,
   balancing means for detecting the angular position of engine unbalance including a phase controller for storing unbalance position information,
   means for producing a first signal in synchronism with engine rotation,
   means responsive to the first signal including the phase controller for producing a second signal phase displaced from the first signal by an amount dependent on the angular position of unbalance,
   a phase shifting circuit for adjusting the phase of the second signal by an amount corresponding to the predetermined angle of coasting,
   a squaring amplifier for producing a square wave in phase with the phase adjusted second signal,
   a differentiator circuit for producing a pulse in time with the leading edge of each positive square wave,
   and a relay circuit responsive to a pulse for operating the means disconnecting the air pressure means,
   whereby the engine comes to a stop with its position of unbalance at a preset location.

4. A method of stopping an air-motored engine to come to a rest at an angular position determined according to the angle of unbalance comprising:
   determining for a given type of engine the coasting angle occurring after the termination of air motoring,
   driving an engine by supplying air pressure pulses to the cylinders thereof,
   determining the angular position of unbalance,
   generating an unbalance signal in phased relation with the engine, the phase depending on the position of unbalance,
   adjusting the phase of the unbalance signal to compensate for the value of the coasting angle,
   and interrupting the air supply to the engine according to the phase adjusted signal whereby the engine will stop with its position of unbalance at a preset location after coasting through an angle consistent with the phase adjustment angle.

References Cited

UNITED STATES PATENTS 3,213,690  10/1965  Walton _____ 73—462
3,302,491  2/1967   Bjorn et al. _____ 73—462 X JERRY W. MYRACLE, Primary Examiner U.S. Cl. X.R.

73—462